United States Patent [19]

Harrison et al.

[11] 4,003,689
[45] Jan. 18, 1977

[54] DIE-GAP ADJUSTING MEANS

[75] Inventors: Eugene Harrison, Central; Edgar G. Williams, Greenville, both of S.C.

[73] Assignee: Celanese Corporation, New York, N.Y.

[22] Filed: Sept. 15, 1975

[21] Appl. No.: 613,678

[52] U.S. Cl. .................................. 425/466; 425/381
[51] Int. Cl.[2] ............................................. B29F 3/04
[58] Field of Search ................. 264/176 R; 425/380, 425/381, 466, 467, 190, 191, 192; 72/253

[56] References Cited

UNITED STATES PATENTS

| | | | |
|---|---|---|---|
| 2,963,741 | 12/1960 | Longstreth et al. | 425/466 |
| 3,096,543 | 7/1963 | Konopacke et al. | 425/466 |
| 3,162,896 | 12/1964 | Seubert | 425/466 |
| 3,267,519 | 8/1966 | Albert | 425/466 |
| 3,829,274 | 8/1974 | Melead | 425/466 |

Primary Examiner—Richard B. Lazarus
Assistant Examiner—Mark Rosenbaum
Attorney, Agent, or Firm—M. Bressler; L. I. Grim; T. J. Morgan

[57] ABSTRACT

An adjusting means for controlling the thickness of extrudate exiting from a die. The adjusting means includes a non-flexible block, connected to the die and provided with a tapped hole. Another block, a flexible block is also provided. It is connected to a flexible lip of the die and is also provided with a tapped hole. A bolt which includes a first threaded cylindrical section having a first threaded pitch is also provided. The first threaded cylindrical section is accommodated in the tapped hole provided on the non-flexible block. The bolt further comprises a second threaded cylindrical section having a second thread pitch accommodated in the tapped hole provided on the flexible block. The first and second cylindrical sections are distinguished in that the first and second thread pitches are different.

19 Claims, 3 Drawing Figures

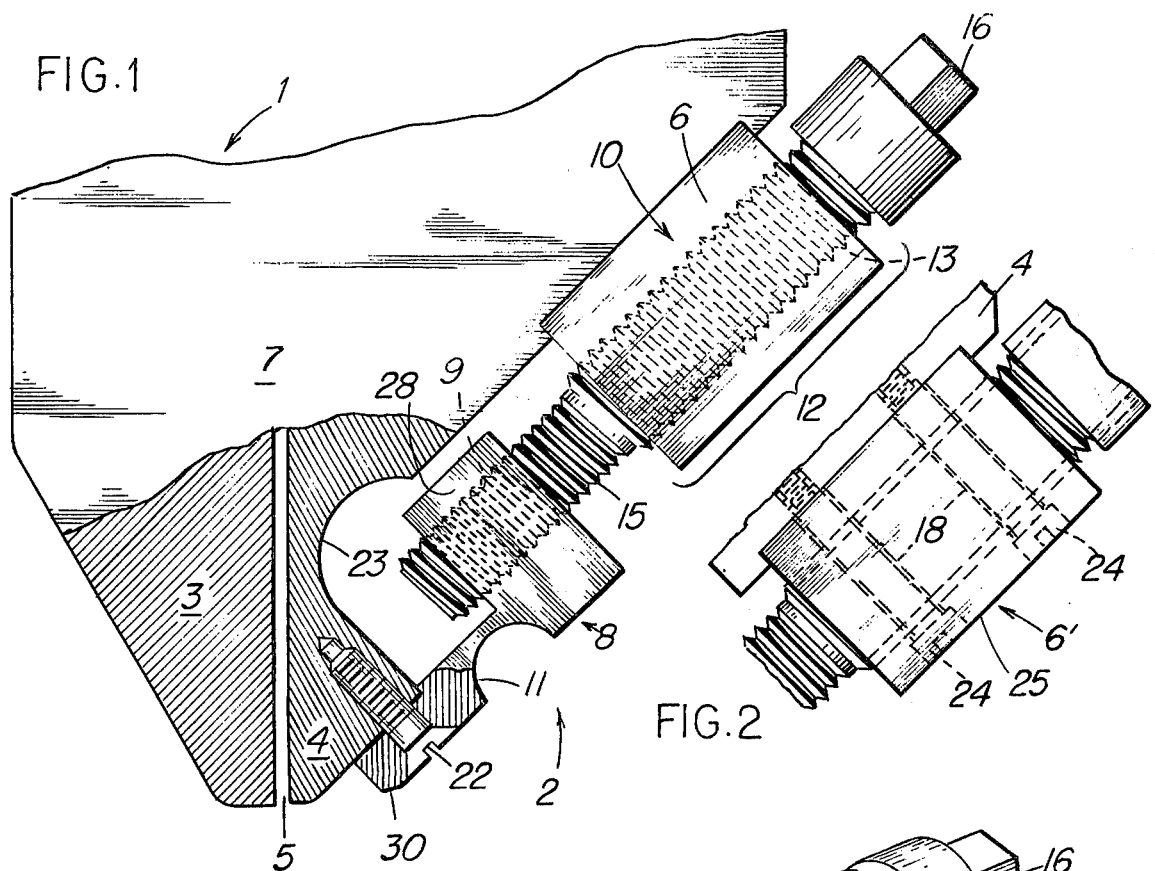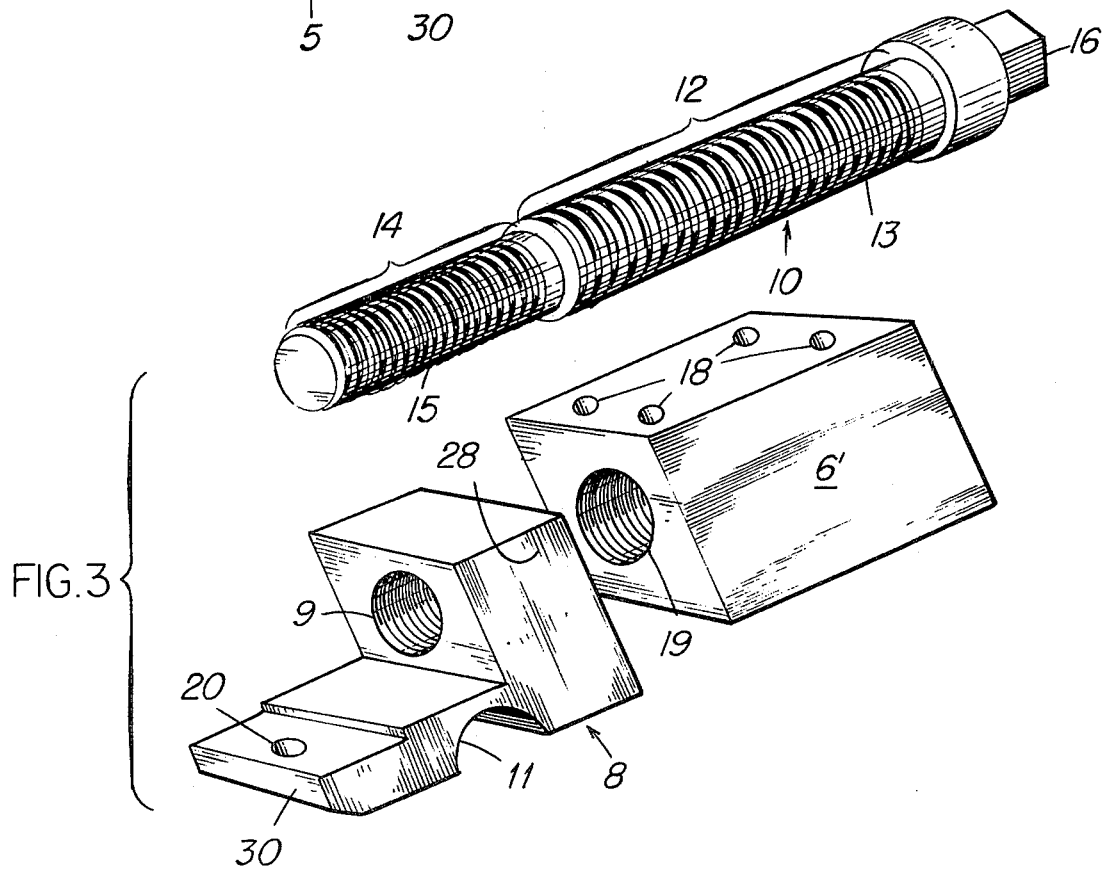

DIE-GAP ADJUSTING MEANS

BACKGROUND OF THE DISCLOSURE

1. Field of the Invention

The instant invention is directed to an apparatus for controlling the thickness of extrudate moving from a die. Still more specifically the instant invention is directed to an adjusting means for controlling the thickness of a polymeric melt extruding from a slot die in which the adjustment means comprises a bolt having two separate threaded sections for precisely controlling the movement of a flexible lip, which with a stationary lip defines the die lip opening.

2. Background of the Prior Art

A common method for forming a plastic film is to extrude a polymer, which is in a liquid or semi-liquid state, through a shaping device. The shaping device through which the liquid or semi-liquid polymer is extruded is called a die. The extrudate, as the liquid is called, is then solidified by suitable means to produce the solid state polymeric film.

The two most common dies employed in the production of polymeric film are the circular die and the slot die. The circular die is a circular shaped opening through which polymeric liquid is extruded to form a tubular shaped film. The slot die is employed to produce a single ply film when solidified. It is this latter type of die to which the instant application is directed.

Slot dies are employed in the production of polymeric films where the liquid state polymer is in the form of a melt, that is, a homogeneous single component liquid or, alternatively, in the form of a solution, a two component liquid comprising the polymer, the solute, and solvent, in which the polymer is dissolved. In either case the thickness of the film produced is a function of the die lip opening. The die lip opening is the opening provided for the extrudate, the liquid or semi-liquid polymer in melt or solvent form, to exit the die. Although this thickness is critical in all applications, it is often of more critical importance when the extrudate is a melt because the final thickness of the formed film is proportional to the tickness of the liquid melt as it exists through the slit die lip opening. Indeed, all polymeric films which require precision gauge control are melt extruded through a slotted die. Included in the class of polymeric films requiring precision gauge control, which are formed by melt extrusion through a slotted die, are polyester, polyolefins, polycarbonate and polyacetal films.

In the production of films by melt extrusion through a slotted die, the hot polymeric melt enters the die body, which is usually constructed of steel, and extruded through the die lip opening as a thin sheet. Along the length of these lips are located adjusting bolts which are spaced equidistantly apart from each other. The bolts are turned with a wrench or other appropriate means to open and close the die lip opening to thus alter the thickness of the film which extrudates therethrough.

In the prior art the adjusting bolts, often called the die bolts, comprise a long threaded section which moves through a tapped hole in a stationary block connected to the die body. Adjacent to one end of this long threaded section is a head provided for the turning of the bolt by a suitable tool. At the other end of the long threaded section is a nonthreaded cylindrical section. Disposed over this non-threaded section is a clip, a forked shaped yoke integrally connected with a perpendicular element which is connected to the die lip. The non-threaded section of the prior art bolt is provided with a stop mechanism, a larger diameter cylindrical section which limits the movement of the yoke of the clip. An extension of the non-threaded cylindrical section beyond the enlarged diameter portion may be included to provide additional pushing force in the direction of closing the die lip.

The above design represents an operable method by which the die lips are adjusted to provide gauge control. However, certain disadvantages result from the operation of this design. Because the threaded section is relatively coarse, a necessity in view of the strength requirements, the sensitivity of the bolt is very great. Alternately stated, the resolution is very poor. That is, a relatively small turn of the bolt makes for a significant change in the die lip opening. This makes it necessary for the operator to be quite skilled in the operation of the bolts to achieve the desired change in thickness.

In addition to the above disadvantage, poor resolution, the employment of a single threaded section also results in high frictional torque that must be overcome. Thus a significant degree of force must be employed to turn the bolt. This, in reality, is another aspect of poor resolution. The more difficult it is to turn the bolt the more difficult it is to adjust the bolt to the desired degree so as to obtain the desired change in die lip opening.

Another disadvantage of the push-pull die bolt of the prior art relates to the non-threaded section over which the yoke of the clip is disposed. Again, the problem is one of poor resolution. This problem occurs when the yoke is disposed approximately intermediate between the ends of the non-threaded section defined by the threaded section at one end and the enlarged diameter portion of the non-threaded section at the other. With the bolt in this position, turning of the bolt does not actuate any movement of the die lips. This so-called "neutral zone" makes adjustment all the more difficult.

Another difficulty associated with the employment of the push-pull die bolt of the prior art again relates to the problem of high frictional torque. Although high frictional torque is caused in part by the employment of a single coarse threaded bolt, of equal consequence is the temperature to which the bolt is exposed. Typically, the die body is exposed to high polymeric melt temperatures which often exceed 500° F. At these temperatures the typically employed lubricants for bolts, petroleum based lubricants, are ineffective. In the absence of a lubricant, high temperature causes the bolt threads to seize. This not only results in high frictional torque resistance but also causes frequent replacement of the bolt due to wear.

The above disadvantages of the push-pull die bolt of the prior art suggests the need of a new design which overcomes these difficulties while retaining the useful properties inherent in the use of a push-pull design.

SUMMARY OF THE INVENTION

The instant invention is directed to adjusting means which provides excellent control of a die lip opening. A feature of the instant invention is the excellent resolution obtainable by the adjusting means of this invention. That is, the adjusting means provides a very small movement per degree of bolt rotation which permits even an inexperienced operator to control, to a high degree of accuracy, the die lip opening. The instant invention furthermore, elimates neutral zone to further improve resolution. By elimination of the neutral zone movement of the adjusting means always effects movement in the die lip opening. The adjusting means of the instant invention is also characterized by decreased torque resistance because of the unique design of the adjusting means. Another characteristic of this invention is that torque resistance due to high temperature exposure is significantly decreased, with attendant longer useful life of the elements of the adjusting means.

In accordance with the instant invention an adjusting means is provided for controlling the thickness of an extrudate moving from a die. The invention includes a non-flexible block, connected to the die body, which is provided with a tapped hole. A flexible block is also provided. It is connected to a flexible lip of the die and is also provided with a tapped hole. The adjusting means also includes a bolt which includes a first threaded cylindrical section having a first thread pitch. The first threaded cylindrical section is accommodated in the tapped hole provided on the non-flexible block. The bolt also includes a second threaded cylindrical section having a second thread pitch. The second threaded cylindrical section is accommodated in the tapped hole provided on the flexible block. The bolt is characterized by the requirement that the first thread pitch be different from the second thread pitch.

BRIEF DESCRIPTION OF THE DRAWINGS

The instant invention may be better understood with reference to the accompanying drawings of which:

FIG. 1 is an elevational view, partly in section, of the instant invention;

FIG. 2 is an elevational view, partly in section, of a portion of the instant invention illustrating another preferred embodiment thereof; and FIG. 3 is an exploded view of the elements of the instant invention.

DETAILED DESCRIPTION

Turning now to the drawings in detail, a preferred embodiment of the apparatus of the instant invention is depicted in FIG. 1. FIG. 1 illustrates the adjusting means of this invention as it is disposed on a slotted die. The adjusting means disposed on the slotted die is generally indicated at 1. The adjusting means, generally indicated at 2, is depicted connected to the slotted die body generally indicated at 7. The slotted die is preferably a rectangular shaped (partially shown) container of metal construction. Preferably the die container is of steel construction. The die body 7 terminates in a pair of die lips. One of the die lips, denoted in the drawings at 3, is stationary while the second die lip 4 is flexible. The die lip opening 5 is defined by the opening provided between die lips 3 and 4. The thickness of the extrudate exiting the die is a function of the die lip opening 5. It is the function of the adjusting means 2 to control the size of the die lip opening 5.

The adjusting means 2 of the instant invention includes a bolt generally indicated at 10. The bolt 10 comprises a first threaded section 12 having a first thread pitch 13 and a second threaded section 14 characterized by a second thread pitch 15. The second threaded section 14 is disposed adjacent to the first threaded secton 12. Also disposed adjacent to the first threaded section 12, at its opposite end, is a die bolt head 16. The bolt head 16 provides the means for transmitting a torque for turning the bolt. In the preferred embodiment illustrated in the drawings, the die bolt head 16 is in the form of a square head. Obviously, other die bolt heads may be employed to provide the same function. For example, the die bolt head may be hexagonal shape. Alternatively, the die bolt head may comprise an impresseion or cut-out to accommodate any one of the many commonly employed screw drivers or other like tools.

The bolt 10, often referred to as a differential bolt, is preferably of steel construction. In a preferred embodiment the steel differential bolt 10 has a nitrided surface. That is, the differential bolt 10 is exposed to a nitrogeneous medium, for example ammonia gas, at an elevated temperature. The resulting nitrided steel provides a hardened surface more resistant to softening caused by continuous exposure to elevated temperatures than untreated steel. The employment of nitrided steel, rather than nonnitrided steel, as employed in the prior art, tends to reduce galling and seizing, a common defect of the prior art adjusting means. Another beneficial effect of employing nitrided steel differential bolt in the adjusting means 2 of the instant invention is the improvement in endurance strength of the treated part. Thus, the adjusting means 2 is less subject to fatigue resulting in longer useful life. It is noted that in certain cases the bolt 10 may comprise metals other than steel. It is obvious that the other element of this invention, to be discussed below, may also, in a preferred embodiment, be nitride treated.

In a preferred embodiment of the instant invention, the bolt 10 is coated with a dry lubricant. A lubricant coating on the bolt 10 is beneficial in that it tends to decrease the resistance torque that is attendant in the prior art. However, most lubricants breakdown at high temperatures. To overcome this difficulty and yet retain the beneficial effects of lubricity, a coating that retains its lubricating properties at high temperatures is used. Therefore, the lubricating coating employed on the bolt 10 is a composition which includes molybdenum disulfide as the basic constituent. As those skilled in the art are aware, certain dry lubricant coatings including molybdenum disulfide can withstand a temperature as high as 75° F. while retaining their excellent lubricating properties. It is also noted that the dry lubricant molybdenum disulfide coating of this invention is easily applied to metal pieces, such as the bolt 10, as is well known to those skilled in the art.

The bolt 10, a differential bolt, as stated above, comprises a first threaded cylindrical section 12. The thread pitch 13 of the first threaded cylindrical section 12, in a preferred embodiment, has a number of threads per inch in the range of between about fourteen and twenty. The second threaded cylindrical section 14, in a preferred embodiment, has a number of threads per inch in the range of between about eighteen and thirty. As will be discussed in greater detail hereinafter the number of threads per inch on the first threaded section 12, in a preferred embodiment, differs from the number of threads per inch on the second threaded section 14 by between about one and ten.

In the preferred embodiment illustrated in the drawings, the first section 12 of the differential bolt 10 is shown as having a greater diameter than the second threaded section 14. It is emphasized that this is merely one preferred embodiment employed because of ease of construction. The reverse configuration is also within the contemplation of this invention. Furthermore, it is within the contemplation of this invention for the bolt 10 of the adjusting means 2 of this invention to be provided with a first threaded section 12 and a second threaded section 14 wherein the diameter of the two cylindrical sections are the same. Similarly, in the preferred embodiment illustrated in the drawings, the first threaded section 12 is depicted as having a greater axial length than the threaded section 14. This again is but one preferred embodiment of this invention. In other preferred embodiments of this invention the second threaded section 14 is of greater axial length than the first threaded section 12. Also, the lengths of the two threaded sections may be the same.

The adjusting means 2 also includes a non-flexible, or stationary block 6. The non-flexible block 6 is provided with a tappped hole 19 which accommodates the thread pitch 13 of the first cylindrical threaded section 12 of the bolt 10. In a preferred embodiment, the non-flexible block 6 has a rectangular cross-sectional shape with the tapped hole 19 preferably disposed at the center of said rectange. The tapped hole 19 extends axially from one end of the block 6 to the other. The block 6, in one preferred embodiment, is integrally connected to the die body 7 above the flexible lip 4. This preferred embodiment is illustrated in FIG. 1 of the drawings. As noted in FIG. 1 the block 6 is homogeneous with the die 7. In another preferred embodiment of the instant invention a non-flexible block 6' is detachable connected to the die body 7 above the flexible lip 4. This preferred embodiment is illustrated in FIGS. 2 and 3 of the drawings. In this preferred embodiment a plurality of holes 18 are disposed perpendicular to the direction of the tapped hole 19. In the preferred embodiment illustrated in the drawing, four such holes 18 are used to fasten the non-flexible block 6 to the die body 7. The hole 18 each accommodate a connecting means, preferably machine screws 24 for detachable connection to die body 7 as will be discussed hereinafter.

The non-flexible block 6 or 6', like the bolt 10, is preferably of steel construction. In a preferred embodiment, the block 6 or 6' is provided with a dry lubricant coating of the same type used in the preferred embodiment of the bolt 10 thus providing the block 6 or 6' with a dry lubricant coating comprising molybdenum disulfide. As stated above the non-flexible block 6 or 6' may also be treated to provide a nitrided surface. However, the beneficial effects of nitriding are attained when one of the mating parts is very hard, such as by nitriding, while its mating part is relatively softer. Thus, in the preferred embodiment wherein the bolt 10 is nitriding, its mating part, the non-flexible block 6 or 6' is not. In another preferred embodiment the block 6 or 6' is nitriding and the bolt 10 is not. This embodiment provides the same advantages provided in the previous embodiment.

The adjusting means 2 of the instant invention is also provided with a flexible block 8. The flexible block 8 comprises a first element 28 through which a tapped hole 9 is disposed. The tapped hole 9 accommodates the second thread pitch 15 of the second cylindrical section 14 of the bolt 10. The flexible block 8 furthermore comprises a second element 30. The element 30 is normal and integral with the first element 28 of the block 8. In a preferred embodiment the element 30 is provided with a cut-out section to increase the flexibility of the flexible block 8. In a preferred embodiment the cut-out section is in the form of an arc 11. The element 30 is additionally provided with a small hole 20. The hole 20 accommodates a connecting means for attachment to the die lip 4 as will be discussed hereinafter. As in the case of the non-flexible block 6 and the bolt 10, the flexible block 8 is preferably of steel construction. More preferably, the block 8 is provided with a dry lubricant coating which includes molybdenum disulfide as a basic constituent. The flexible block 8 may also be nitrided, pursuant to the same restriction noted above with regard to the non-flexible block 6 or 6'. Thus, in a preferred embodiment, the flexible block 8 is nitrided and the bolt 10 is not. The reverse situation provides another preferred embodiment. That is, the bolt 10 is nitrided and the block 8 is not. It is emphasized that in general it is preferable that either the bolt 10 or the blocks 6 or 6' and 8 be nitrided but not both in order to obtain the beneficial effects of nitriding.

In operation, the non-flexible block 6 is integrally connected, that is, homogeneous with the die body, specifically above the flexible lip 4 (as shown in FIG. 1), or in another preferred embodiment, the block 6' is detachably connected thereto by one or more connectors. In this latter preferred embodiment, it is preferable to employ machine screws or the like. In a preferred embodiment illustrated in FIG. 2 a plurality of connecting means 24, in the form of machine screws, are employed to connect the non-flexible block 6 to the die body. In this preferred embodiment holes 18 are provided to accommodate the machine screws 24. The head of the screws are conveniently disposed on surface 25 of block 6' for easy access.

The flexible block 8 is detachably attached to the die lip 4 in a matter analagous to the method by which the detachably attached embodiment of the non-flexible block 6' attached to the die body 7. That is, a suitable connecting means is employed to connect the block 8 to the die lip 4. In a preferred embodiment illustrated in the drawings, a connecting means in the form of a machine screw 22, accommodated in the hole 20 provided on the second element 30 of the flexible block 8, is employed to connect the flexible block 8 to the die lip 4. As in the case of the non-flexible block 6', the head of the screw 22 is disposed on the side of the block 8 providing easy access for attachment and removal. Also, a tapped hole is provided on the die lip 4 to accommodate this connecting screw to connect block 8 to the die lip 4. As discussed above and as illustrated in the drawings, a preferred embodiment of this invention employs a single hole 20 accommodating a single threaded screw 22. Obviously, additional holes accommodating additional connecting means may also be provided if preferred. As depicted in FIG. 1 the differential threaded bolt 10 is accommodated in tapped holes 19 and 9 of the non-flexible block 6 or 6' and flexible block 8, respectively. As the differential bolt 10 is turned causing a translational movement of the bolt in the axial direction, the non-flexible block 6 remains stationary. The flexible block 8, on the other hand, moves in response to the rotational torque imparted to the bolt head 16. The rotational torue applied to the bolt head 16 translates into a translational movement in the axial direction to either push the die lip opening 5 towards the closed direction or, alternatively, to pull the die lip 4 to increase the die lip opening 5. Obviously, the non-moveable die lip 3 remains stationary during the movement of the adjusting means 2.

The movement of the flexible block 8 which acts to move the die lip 4 represents an advance in the art. In the prior art equivalent to the flexible block 8, die bolt adjustment resulted in a deflection between the threaded bolt equivalent of bolt 10 and the opening provided on the equivalent of the flexible block 8. This resulted in a significant torque resistance, poor resoltuion, and rapid wear of the bolt and tapped hole accommodating the bolt. By providing a cut-out section as illustrated at 11, in the form of an arc the section modulus of the block 8 is decreased, thus increasing its flexibility. This flexibility helps maintain alignment of the first element 28 of the flexible block 8 with the second threaded section 14 of the bolt 10. It is noted that the cut-out section of the type depicted at 23, provided on the flexible die lip 4, improves die lip flexibility to improve response to movement of the bolt 10.

It is important to emphasize the unique operation of the bolt 10 of the instant invention. The bolt 10 includes, as indicated above, first and second threaded sections 12 and 14 provided with first and second thread pitches 13 and 15, respectively. As indicated above, the first thread pitch 13 must be different from the second thread pitch 15. This is necessary in that if the first and second threaded sections have the same pitch there would be no relative motion between blocks 6 and 8. Indeed, when the first and second threaded sections have the same thread pitch, the bolt 10 acts as a connecting screw, that is, the turning of the bolt 10 results merely in movement of the bolt only.

The above paragraph indicates the necessity that the thread pitch of the first and second cylindrical sections 12 and 14 of the bolt 10 be different. Although it is not essential, it is preferable that the thread pitches 13 and 15 of the first and second cylindrical sections 12 and 14 differ by a minimum amount. The movement of the die lip opening 5, as manifested by activation of the bolt 10, described above is proportional to the difference of the two thread pitches. Of course, this assumes that the thread pitch of the first and second cylindrical sections are in the same direction. For this reason, not only is it preferable that the thread pitches 13 and 15 be close to each other, but also that the thread pitches 13 and 15 be in the same direction. It is to be appreciated that it thread pitches 13 and 15 are opposite, i.e., one right handed and the other left handed, the relative movement of the non-flexible block 8 is the sum, rather than the difference of the thread pitches. The above remarks explain the concept of resolution. Put simply, the more turns of the bolt 10 it takes to move the flexible block 8 a fixed length the greater the resolution. The preferred embodiment wherein the first and second thread pitches are in the same direction and close to each other in number represent the optimum resolution. As indicated above, the preferred embodiment wherein the number of threads per inch on threaded sections 12 and 14 differ by a number in the range of between about one and ten represents a desirable resolution and is thus preferred. This is not to say that the number of threads on threaded sections 12 and 14 cannot differ by more than 10 threads per inch and still be within the scope of this invention. Or, for that matter, that the threads on threaded sections 12 and 14 can never be in opposite directions. Such embodiments may be employed in applications where a very large die lip is provided. Rather, in the most commonly encountered applications of this invention, the most satisfactory results are obtainable when the preferred embodiment suggested above is employed.

The description of the preferred embodiments given above are meant to be illustrative of the scope and spirit of the instant invention. These preferred embodiments will make apparent to those skilled in the art other embodiments within the scope and spirit of the invention described above. These other embodiments, made apparent by this description, within the scope and spirit of this invention, are within the contemplation of this invention. Therefore, the invention should be limited solely by the appended claims.

What is claimed is:

1. An adjusting means for controlling the thickness of extrudate moving from a die comprising:
    a non-flexible block, connected to a die body, provided with a tapped hole;
    a flexible block, connected to a flexible lip of said die body, provided with a tapped hole; and
    a bolt including a first threaded cylindrical section, having a first thread pitch, accommodated in said tapped hole provided on said non-flexible block, and a second threaded cylindrical section, having a second thread pitch, accommodated in said tapped hole provided on said flexible block, said second thread pitch being different from said first thread pitch.

2. An adjusting means in accordance with claim 1 wherein said bolt includes means adjacent said first cylindrical section for applying a force for turning said bolt.

3. an adjusting means in accordance with claim 2 wherein said means provided on said bolt for applying the force comprises a square head, said head disposed adjacent to said first cylindrical section.

4. An adjusting means in accordance with claim 1 wherein said non-flexible block is an integral part of said die.

5. An adjusting means in accordance with claim 1 wherein said non-flexible block is detachably connected to said die.

6. An adjusting means in accordance with claim 5 wherein said non-flexible block is detachable connected to said die by means of a plurality of machine screws accommodated in holes provided on said non-flexible block.

7. An adjusting means in accordance with claim 1 wherein said flexible block is provided with a cut-out section to increase its flexibility.

8. An adjusting means in accordance with claim 7 wherein said cut-out section is arc shaped.

9. An adjusting means in accordance with claim 1 wherein said first and second threaded sections provided on said bolt are both threaded in the same direction.

10. An adjusting means in accordance with claim 9 wherein the number of threads per inch of said first and second threaded sections differs by about one and ten.

11. An adjusting means in accordance with claim 1 wherein said number of threads per inch of said first threaded section is in the range of between about fourteen and twenty.

12. An adjusting means in accordance with claim 11 wherein said number of threads per inch of said second threaded section is in the range of between about eighteen and thirty.

13. An adjusting means for controlling the thickness of an extrudate moving from a slit die comprising:

a non-flexible block connected to said die, said block having a rectangular shaped crosssection, provided with a tapped hole;

a flexible block, comprising a first member connected to a flexible lip of said die and a second member, disposed normal to, and integral with said first member, said flexible block provided with a tapped hole; and a bolt including a first threaded cylindrical section having a first thread pitch accommodated in said tapped hole provided on said non-flexible block and a second threaded cylindrical section having a second thread pitch accommodated in said tapped hole provided on said second member of said flexible block, said first and second thread pitches being different.

14. An adjusting means in accordance with claim 13 wherein said bolt is provided with means for applying a torque to turn said bolt, said means for applying a torque disposed adjacent to said first cylindrical section.

15. An adjusting means in accordance with claim 14 wherein said bolt is constructed of steel and has a nitrided surface.

16. An adjusting means in accordance with claim 13 wherein said bolt is coated with a dry lubricant comprising molybdenum disulfide.

17. An adjusting means in accordance with claim 15 wherein said flexible and non-flexible blocks are constructed of steel having a non-nitrided surface.

18. An adjusting means in accordance with claim 13 wherein said bolt is constructed of steel having a non-nitrided surface and said flexible and non-flexible blocks are constructed of steel having a nitrided surface.

19. An adjusting means in accordance with claim 13 wherein said flexible and non-flexible blocks are coated with a dry lubricant composition containing molybdenum disulfide.

* * * * *